(12) United States Patent
Yang et al.

(10) Patent No.: US 12,362,546 B2
(45) Date of Patent: Jul. 15, 2025

(54) SWITCHGEAR ASSEMBLY AND SWITCHGEAR

(71) Applicant: ABB Schweiz AG, Baden (CH)

(72) Inventors: Changzhou Yang, Fujian (CN); Juan Wen, Beijing (CN); Xin Liu, Fujian (CN); Liming Xu, Fujian (CN)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 17/754,985

(22) PCT Filed: Mar. 17, 2020

(86) PCT No.: PCT/CN2020/079674
§ 371 (c)(1),
(2) Date: Apr. 18, 2022

(87) PCT Pub. No.: WO2021/184194
PCT Pub. Date: Sep. 23, 2021

(65) Prior Publication Data
US 2022/0416522 A1 Dec. 29, 2022

(51) Int. Cl.
H02B 13/00 (2006.01)
(52) U.S. Cl.
CPC .................. H02B 13/00 (2013.01)
(58) Field of Classification Search
CPC ..................................... H02B 13/00
USPC ......................................... 361/618
See application file for complete search history.

(56) References Cited

U.S. PATENT DOCUMENTS

| 4,321,421 A * | 3/1982 | Pierce ............... H01F 27/18 174/15.1 |
| 2013/0250487 A1* | 9/2013 | Holaus .............. H02B 1/22 361/612 |
| 2018/0269682 A1* | 9/2018 | Specht ............. H02B 1/565 |

FOREIGN PATENT DOCUMENTS

| CN | 201327955 Y | 10/2009 |
| CN | 201402713 Y | 2/2010 |
| CN | 201773781 U | 3/2011 |
| CN | 102668546 A | 9/2012 |
| CN | 103515855 A | 1/2014 |
| CN | 204614698 U | 9/2015 |
| CN | 204651723 U | 9/2015 |
| CN | 106415762 A | 2/2017 |
| CN | 208174099 U | 11/2018 |
| CN | 208385866 U | 1/2019 |

(Continued)

OTHER PUBLICATIONS

JPH05283243A—English translation (Year: 1993).*

(Continued)

Primary Examiner — Anatoly Vortman
(74) Attorney, Agent, or Firm — GREENBERG TRAURIG, LLP

(57) ABSTRACT

Embodiments of present disclosure relate to a switchgear assembly and a switchgear. The switchgear assembly comprises a housing comprising an internal space filled with an insulating gas; and a plurality of circulating tubes arranged on the housing, each of the plurality of circulating tubes comprising a gas inlet and a gas outlet in fluid communication with the internal space, wherein the gas inlet of each of the plurality of circulating tubes is arranged at a position higher than the respective gas outlet such that the insulating gas is circulated between the housing and the plurality of circulating tubes.

17 Claims, 13 Drawing Sheets

(56) References Cited

FOREIGN PATENT DOCUMENTS

| CN | 110622378 | A |   | 12/2019 |
|----|-----------|---|---|---------|
| CN | 209896461 | U |   | 1/2020  |
| CN | 113437694 | A |   | 9/2021  |
| EP | 1612823   | A1 |  | 1/2006  |
| EP | 2677612   | A1 |  | 12/2013 |
| JP | 03112109  | A | * | 5/1991  |
| JP | 04179207  | A | * | 6/1992  |
| JP | H05283243 | A | * | 10/1993 |
| JP | H10116737 | A |   | 5/1998  |
| JP | H1141732  | A |   | 2/1999  |

OTHER PUBLICATIONS

JP3-112109—English translation (Year: 1991).*
EP1612823—English translation (Year: 2006).*
International Search Report and Written Opinion, issued by the ISA/CN National Intellectual Property Administration, regarding corresponding patent application Serial No. PCT/CN2020/079674; dated Dec. 16, 2020; 9 pages.

* cited by examiner

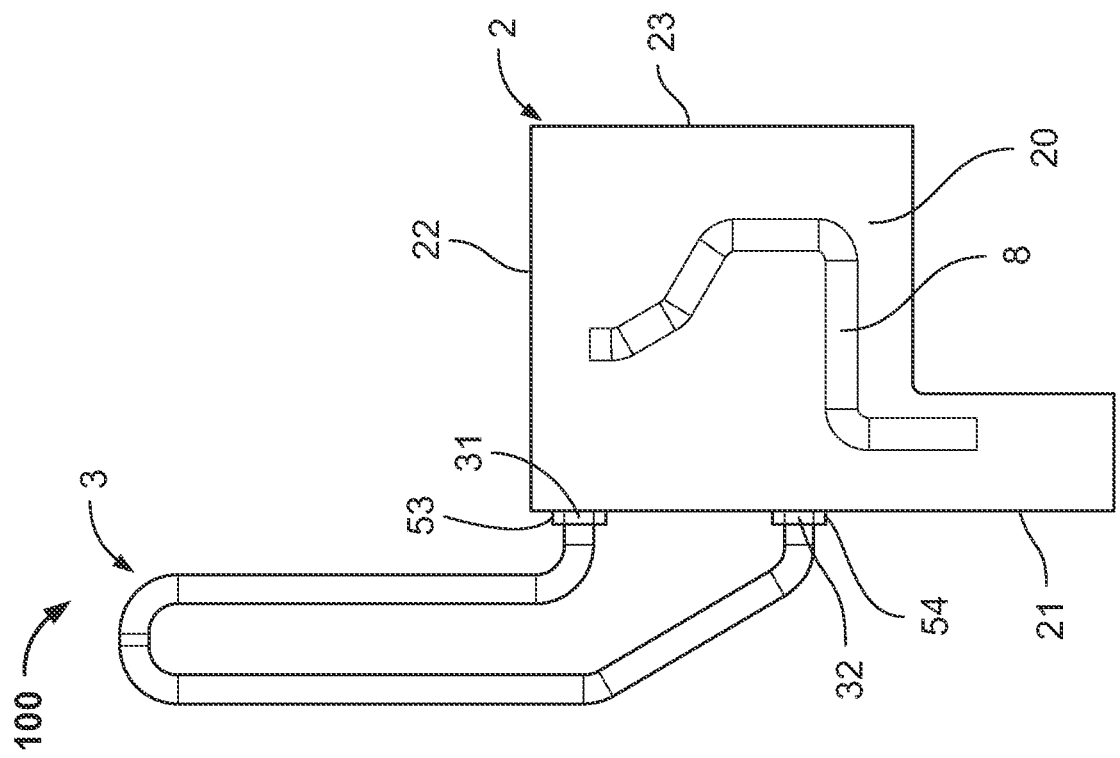
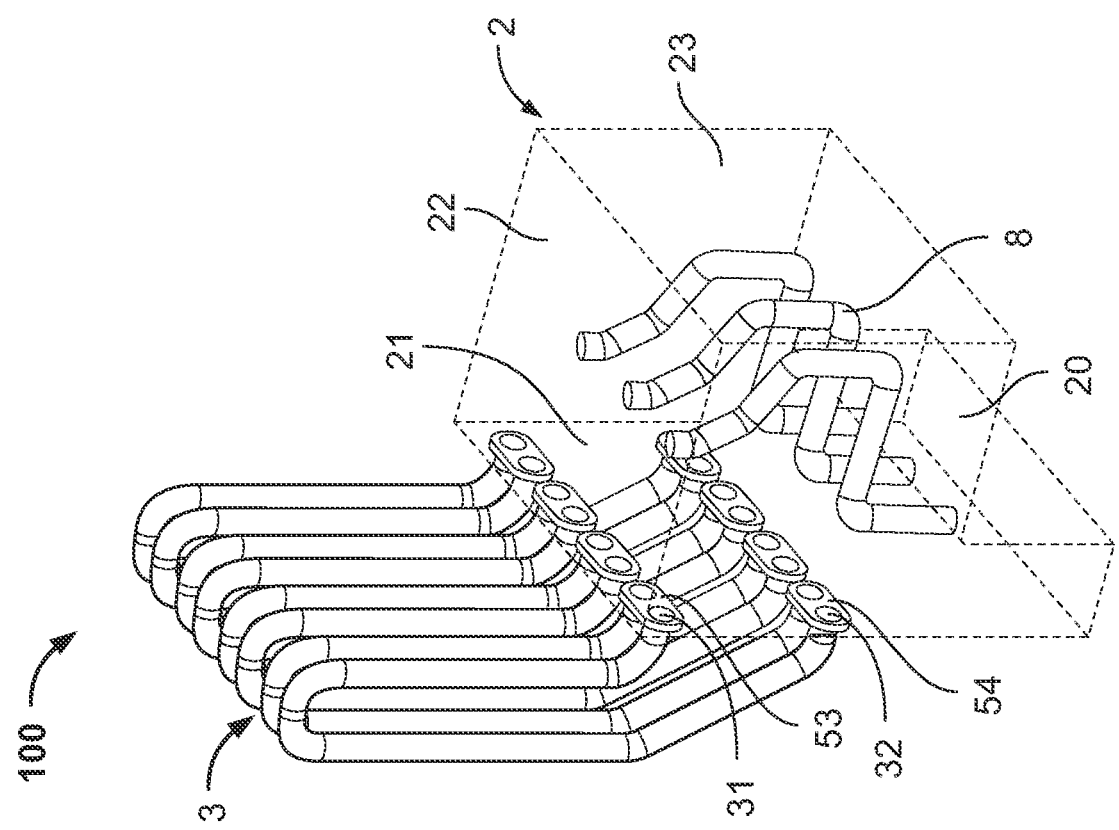

SWITCHGEAR ASSEMBLY AND SWITCHGEAR

CROSS-REFERENCE TO RELATED APPLICATIONS

This is a national stage application which claims priority to International patent application Serial No.: PCT/CN2020/079674, filed on Mar. 17, 2020; and which is herein incorporated by reference in its entirety.

FIELD

Embodiments of the present disclosure generally relate to the field of switchgears, and more particularly, to a switchgear assembly with gas circulating tubes and a switchgear comprising the switchgear assembly.

BACKGROUND

Switchgear typically includes various components arranged in an enclosed housing. During operation of the switchgear, the temperature of the components may rise significantly when a large current flows through the components. The temperature rising would adversely affect the performance of the components or even damage the components.

FIG. 1A illustrates a conventional approach for cooling the components in the switchgear 200. As shown, the switchgear 200 includes a housing 2 filled with an insulating gas, such as $SF_6$. Various components 8, such as a main bus, copper bars, a three-position switch, and a circuit breaker, are arranged inside the housing 2. During operation of the switchgear 200, the temperature of the components 8, especially the three-position switch and the circuit breaker, may be significantly increased. In order to suppress the temperature rise of the components 8, fins 10 for heat dissipation are arranged on a base plate 11 which is coupled to the housing 2 of the switchgear 200. With such an arrangement, the heat generated by the components 8 may be dissipated through thermal radiation and thermal convection. Specifically, on the fins 10 arranged outside the housing 2, the thermal radiation is the main manner for heat dissipation and the effect of the thermal convection is relatively poor. Moreover, inside the housing 2, the manner for heat exchange also includes thermal radiation and thermal convection. However, since the effect of the thermal convection inside the housing 2 is poor, most of the heat generated by the components 8 is accumulated inside the housing 2 and may not reach the border of the housing 2. In this event, although the insulation gas $SF_6$ has excellent insulation performance and temperature rise suppression performance, the temperature rise of the components 8 may still not be suppressed effectively with the conventional approach for heat dissipation as shown in FIG. 1A.

In addition, the insulation gas $SF_6$ is a kind of greenhouse gas which is not environmental friendly. When the insulation gas $SF_6$ is leaked out of the housing 2, it would cause pollution to the environment. Moreover, the use of large number of fins 10 would lead to a relatively high cost.

Chinese Utility Model Patent No. 200790000072.X discloses another conventional approach for cooling components in the switchgear. FIG. 1B is a schematic diagram illustrating a housing of the switchgear disclosed in the above Chinese patent. As shown, several cooling tubes 9 are arranged in a storage portion of the housing. Each cooling tube 9 extends from bottom to top of the storage portion. With such an arrangement, the natural air may flow through the cooling tubes 9 to take away the heat generated by the components in the housing. However, since the cooling tubes 9 are arranged inside the housing, it is hard to perform maintenance on the cooling tubes 9. In some cases, if gas leakage occurs at the cooling tubes 9 inside the housing, the whole switchgear would have to be scrapped. In addition, the cooling tubes 9 inside the housing mainly dissipate the heat through thermal convection and the effect of thermal radiation is relatively low. Further, the heat dissipation performance of the cooling tubes 9 inside the housing is difficult to be extended.

Thus, there is a need for an approach for cooling the components inside the switchgear in a manner of high efficiency, low cost, environmental friendly, and user friendly.

SUMMARY

In view of the foregoing problems, various example embodiments of the present disclosure provide a switchgear assembly for cooling the components inside the switchgear in a manner of high efficiency, low cost, environmental friendly, and user friendly.

In a first aspect of the present disclosure, example embodiments of the present disclosure provide a switchgear assembly. The switchgear assembly comprises a housing comprising an internal space filled with an insulating gas; and a plurality of circulating tubes arranged on the housing, each of the plurality of circulating tubes comprising a gas inlet and a gas outlet in fluid communication with the internal space, wherein the gas inlet of each of the plurality of circulating tubes is arranged at a position higher than the respective gas outlet such that the insulating gas is circulated between the housing and the plurality of circulating tubes.

In some embodiments, the gas inlets of the plurality of circulating tubes are aligned with each other, and the gas outlets of the plurality of circulating tubes are aligned with each other.

In some embodiments, the plurality of circulating tubes are soldered on the housing.

In some embodiments, the plurality of circulating tubes are detachably mounted on the housing via fasteners.

In some embodiments, the switchgear assembly further comprises a fan configured to blow air towards the plurality of circulating tubes.

In some embodiments, an opening size of the gas inlet of each of the plurality of circulating tubes is equal to or larger than that of the respective gas outlet.

In some embodiments, the housing comprises a rear sidewall and a top wall, and the plurality of circulating tubes are arranged near to the rear sidewall of the housing.

In some embodiments, the gas inlet of each of the plurality of circulating tubes is coupled to the top wall of the housing, and the gas outlet of each of the plurality of circulating tubes is coupled to the rear sidewall of the housing.

In some embodiments, the housing further comprises a front sidewall opposite to the rear sidewall, and the switchgear assembly further comprises a plurality of additional circulating tubes arranged near to the front sidewall of the housing and in fluid communication with the internal space.

In some embodiments, the gas inlet and the gas outlet of each of the plurality of circulating tubes are coupled to the rear sidewall of the housing.

In some embodiments, the gas inlet of each of the plurality of circulating tubes is provided with a first flange, the gas outlet of each of the plurality of circulating tubes is provided with a second flange, and the first and second flanges are coupled to the rear sidewall of the housing via fasteners.

In some embodiments, the gas inlets of two or more of the plurality of circulating tubes are coupled to a first connecting part, the gas outlets of the two or more of the plurality of circulating tubes are coupled to a second connecting part, and the first and second connecting parts are coupled to the rear sidewall of the housing via fasteners.

In some embodiments, the gas inlets and the gas outlets of the plurality of circulating tubes are coupled to a mounting plate, and the mounting plate is coupled to the rear sidewall of the housing via fasteners.

In some embodiments, each of the plurality of circulating tubes further comprises: a first tubular extension part extending from the mounting plate into the internal space and being in fluid communication with the respective gas inlet; and a second tubular extension part extending from the mounting plate into the internal space and being in fluid communication with the respective gas outlet.

In some embodiments, an outer surface of at least one of the plurality of circulating tubes is provided with a heat sink.

In a second aspect of the present disclosure, example embodiments of the present disclosure provide a switchgear comprising the switchgear assembly according to the first aspect of the present disclosure.

It is to be understood that the Summary section is not intended to identify key or essential features of embodiments of the present disclosure, nor is it intended to be used to limit the scope of the present disclosure. Other features of the present disclosure will become easily comprehensible through the following description.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein:

FIG. 13 is a perspective view of a switchgear assembly in accordance with another embodiment of the present disclosure;

FIG. 14 is a side view of the switchgear assembly as shown in FIG. 13;

Throughout the drawings, the same or similar reference symbols are used to indicate the same or similar elements.

DETAILED DESCRIPTION OF EMBODIMENTS

Figure 1A:
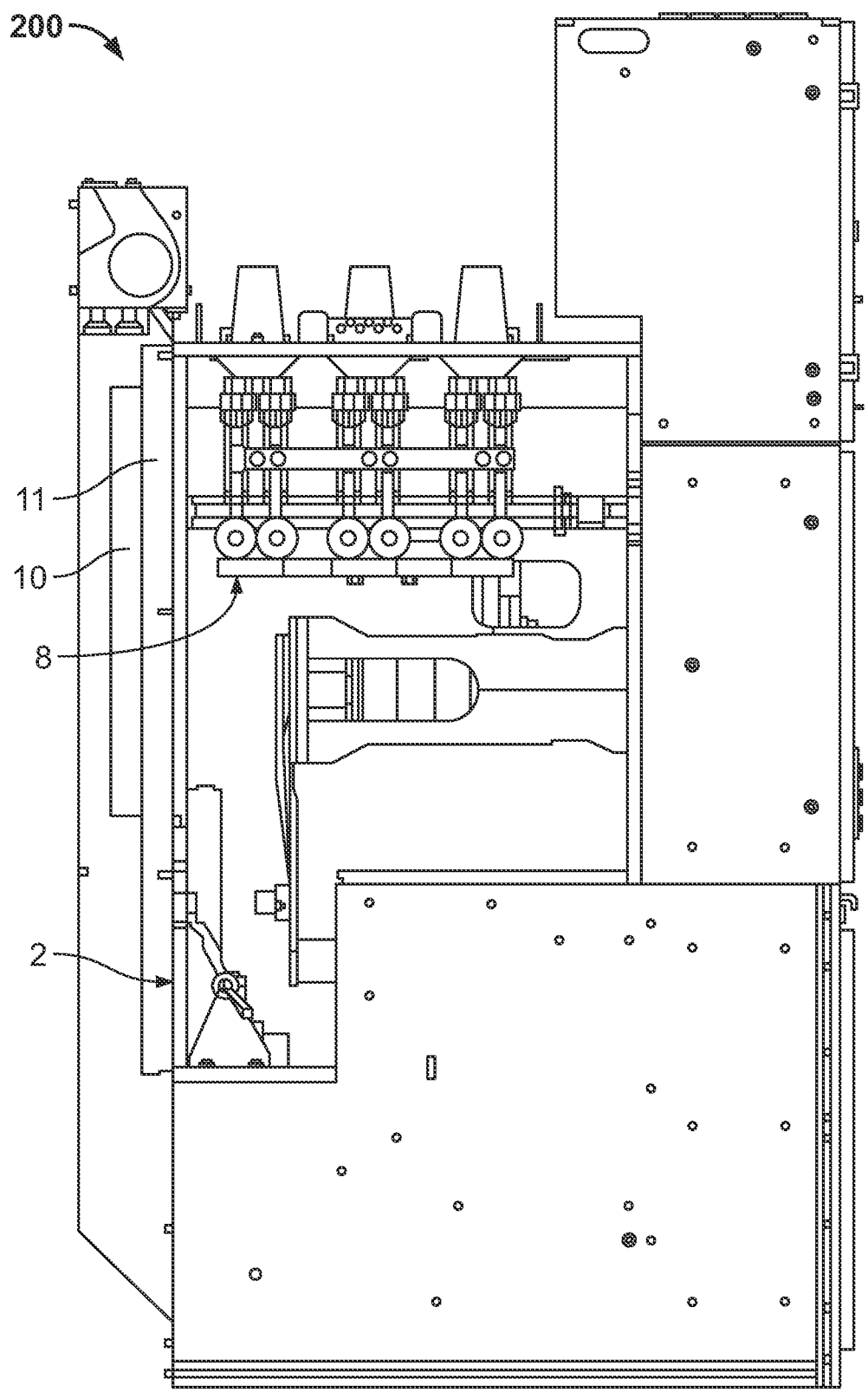
FIG. 1A is a schematic diagram illustrating a conventional switchgear.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

According to embodiments of the present disclosure, a plurality of circulating tubes are arranged on the housing of the switchgear so as to circulate the insulating gas between the housing and a plurality of circulating tubes arranged on the housing, thus reducing the temperature of components inside the housing. The above idea may be implemented in various manners, as will be described in detail in the following paragraphs.

Figure 2:
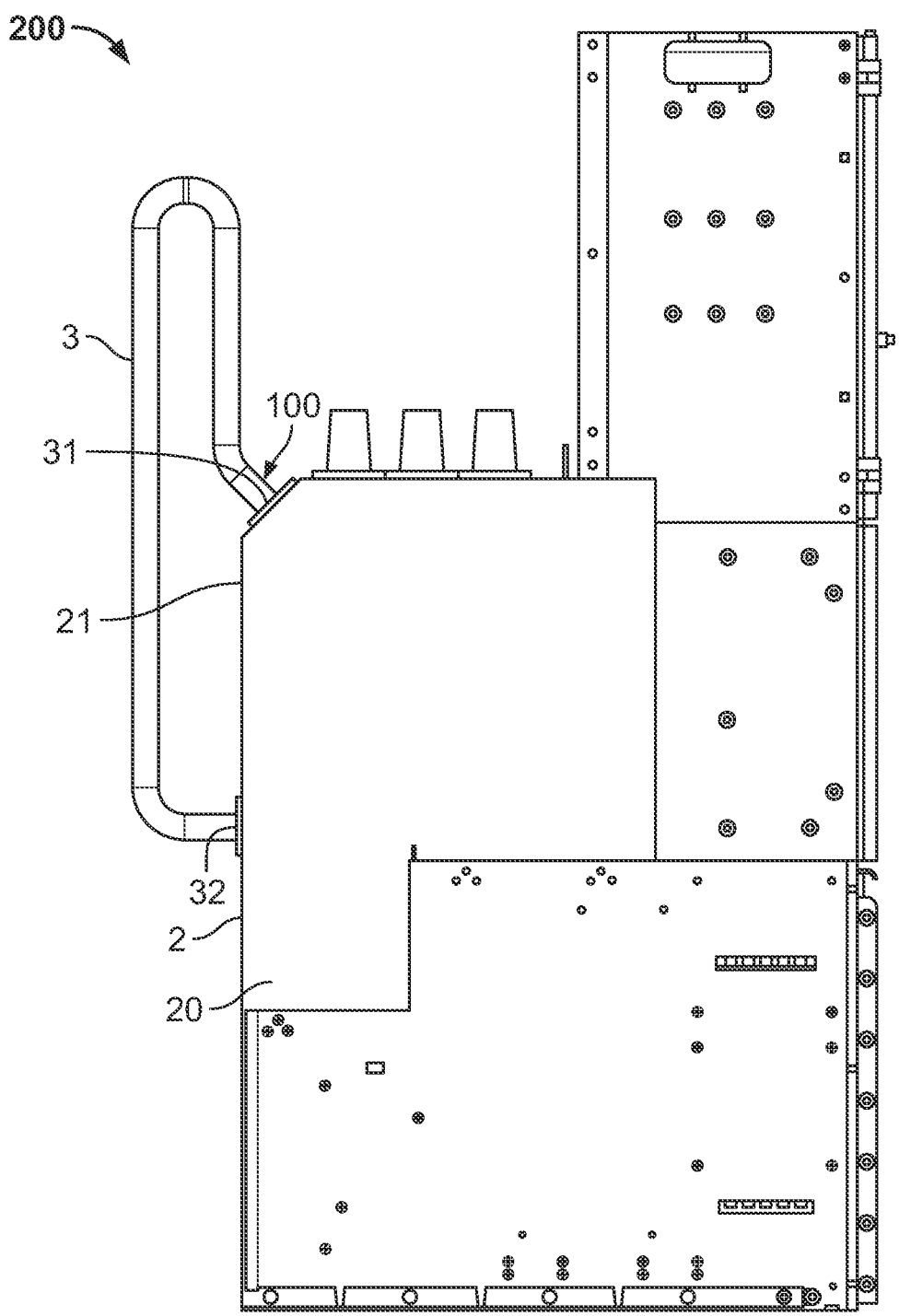
FIG. 2 is a schematic diagram illustrating a switchgear in accordance with an embodiment of the present disclosure.

Hereinafter, the principles of the present disclosure will be described in detail with reference to FIGS. 2-26. Referring to FIG. 2 first, FIG. 2 is a schematic diagram illustrating a switchgear in accordance with an embodiment of the present disclosure. As shown in FIG. 2, the switchgear 200 includes a switchgear assembly 100. The switchgear assembly 100 generally includes a housing 2 and a plurality of circulating tubes 3 arranged on the housing 2. The housing 2 includes an internal space 20 filled with an insulating gas. Each of the circulating tubes 3 includes a gas inlet 31 and a gas outlet 32 in fluid communication with the internal space 20. The gas inlet 31 of each circulating tube 3 is arranged at a position higher than the respective gas outlet 32 such that the insulating gas may be circulated between the housing 2 and the circulating tubes 3.

With the arrangement of the switchgear 200 as shown in FIG. 2, the heat generated by components (not shown in FIG. 2) inside the housing 2 may be dissipated through thermal convection and thermal radiation inside and outside the housing 2. Particularly, the heat dissipation performance can be greatly enhanced through the thermal convection inside the housing 2 and the thermal radiation by the circulating tubes 3. On one hand, due to the chimney effect of the circulating tubes 3 arranged on the housing 2, the convection inside the housing 2 is greatly enhanced. Thus, more heat generated by the components inside the housing 2 may be taken away by the insulating gas. On the other hand, the circulating tubes 3 may exchange heat with the external environment through radiation. Since the circulating tubes 3 have a large contact area with the external environment, the circulating tubes 3 may cool the insulating gas therein sufficiently and supply the insulating gas of low temperature into the housing 2.

In some embodiments, the insulating gas inside the housing 2 may include environmental-friendly gas, such as dry air or AirPlus. Although the insulation performance and the temperature rise suppression performance of the above environmental-friendly gas is lower than the insulation gas $SF_6$, the temperature rise of the components inside the housing 2 may still be suppressed effectively due to the excellent heat dissipation performance caused by the circulating tubes 3 arranged on the housing 2. In some cases, even if the environmental-friendly gas is leaked out of the housing 2, it would not cause pollution to the environment.

Figure 1B:
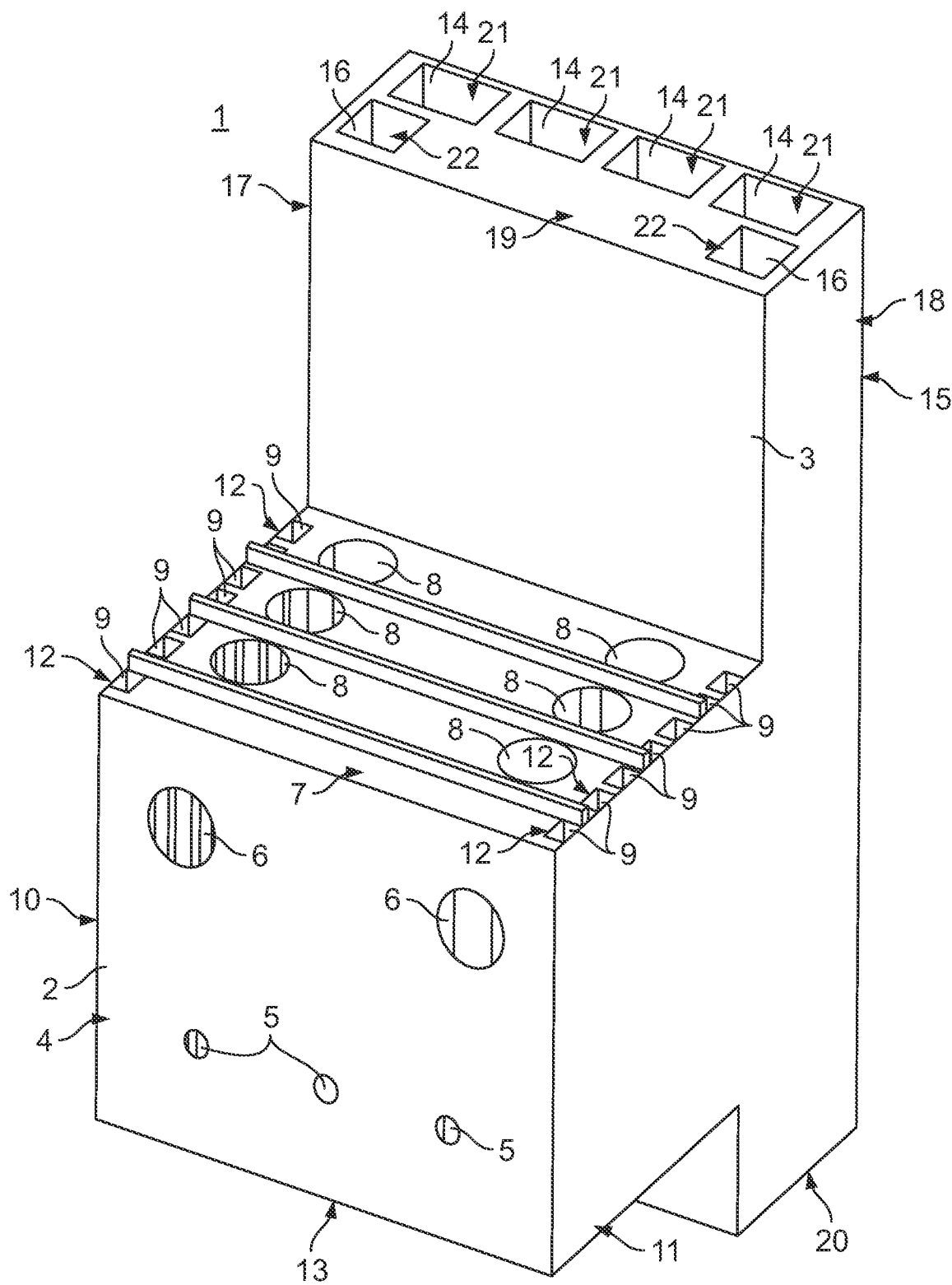
FIG. 1B is a schematic diagram illustrating a housing of another conventional switchgear.

Moreover, in comparison with the conventional approach for cooling components in the switchgear as shown in FIG. 1B, the heat dissipation manner according to embodiments of the present disclosure may bring many additional advantages. First, since the circulating tubes 3 are arranged outside the housing 2, it is easy to detect gas leakage at the circulating tubes 3 and perform gas leakage maintenance on the circulating tubes 3. Second, since the circulating tubes 3 are arranged outside the housing 2, the circulating tubes 3 may provide better thermal radiation performance than the cooling tubes 9 as shown in FIG. 1B. Third, since the circulating tubes 3 are arranged outside the housing 2, the heat dissipation performance of the circulating tubes 3 may be further extended. For example, in some cases, a fan may be arranged near to the circulating tubes 3 to blow air towards the plurality of circulating tubes 3. In this way, the thermal convection around the circulating tubes 3 can be further enhanced, such that the current passing ability of the switchgear 200 may be improved rapidly. The fan may be arranged at various positions relative to the circulating tubes 3. The scope of the present disclosure is not intended to be limited in this respect.

During operation of the switchgear 200, when the temperature of the components inside the housing 2 is increased, the insulating gas around the components would become hot and move upwards. Then, since the temperature of the circulating tubes 3 in contact with the external environment is low, the insulating gas of high temperature would flow into the circulating tubes 3 via the gas inlets 31. Inside the circulating tubes 3, the insulating gas of high temperature exchanges heat with the external environment via the circulating tubes 3. The circulating tubes 3 may provide high heat dissipation efficiency because of the large contact area with the external environment. In addition, the insulating gas of high temperature may exchange heat with cold insulating gas inside the circulating tubes 3. Then, the insulating gas of low temperature may return into the internal space 20 of the housing 2 via the gas outlets 32 to cool the components in the housing 2.

In some embodiments, the cross section of each of the plurality of circulating tubes 3 may be of circular shape. In other embodiments, the cross section of each of the plurality of circulating tubes 3 may be of other shapes, such square, ellipse, etc. The scope of the present disclosure is not intended to be limited in this respect.

In an embodiment, as shown in FIG. 2, an opening size of the gas inlet 31 of each of the plurality of circulating tubes 3 may be generally equal to that of the respective gas outlet 32. In another embodiment, the opening size of the gas inlet 31 of each of the plurality of circulating tubes 3 may be larger than that of the respective gas outlet 32. With such an arrangement, the insulating gas of high temperature inside the housing 2 would be drawn into the circulating tubes 3 more easily. Thus, the heat dissipation performance of the circulating tubes 3 may be further improved. In other embodiments, the opening size of the gas inlet 31 of each of the plurality of circulating tubes 3 may be smaller than that of the respective gas outlet 32. The scope of the present disclosure is not intended to be limited in this respect.

The circulating tubes 3 may be arranged on the housing 2 in various configurations in accordance with embodiments of the present disclosure. FIGS. 3-26 illustrate some example arrangements of the switchgear assembly 100.

Figure 4:
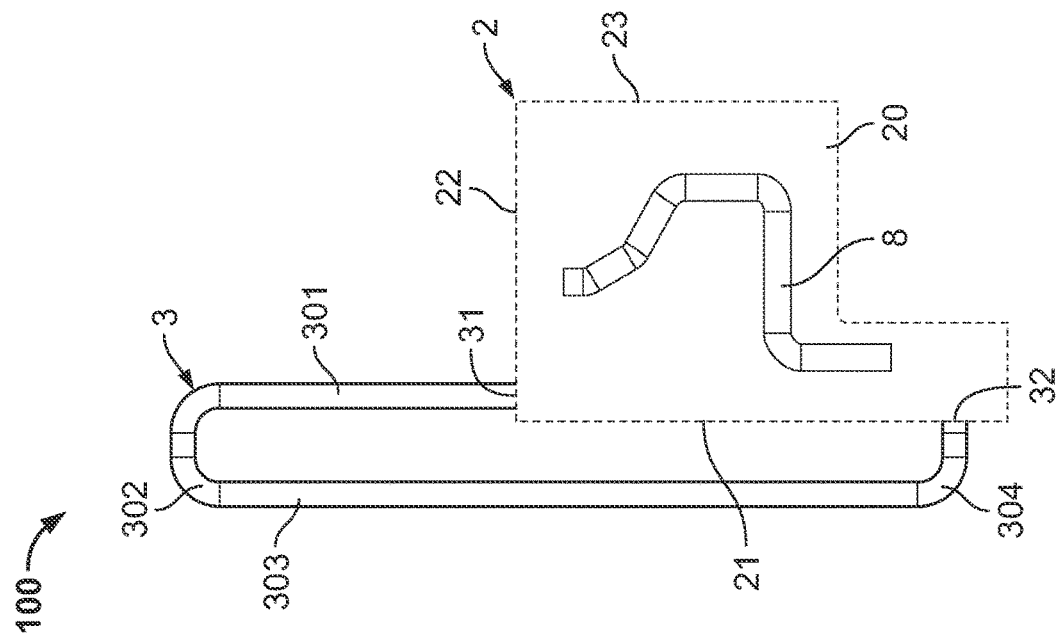
FIG. 4 is a side view of the switchgear assembly as shown in FIG. 3.
Figure 3:
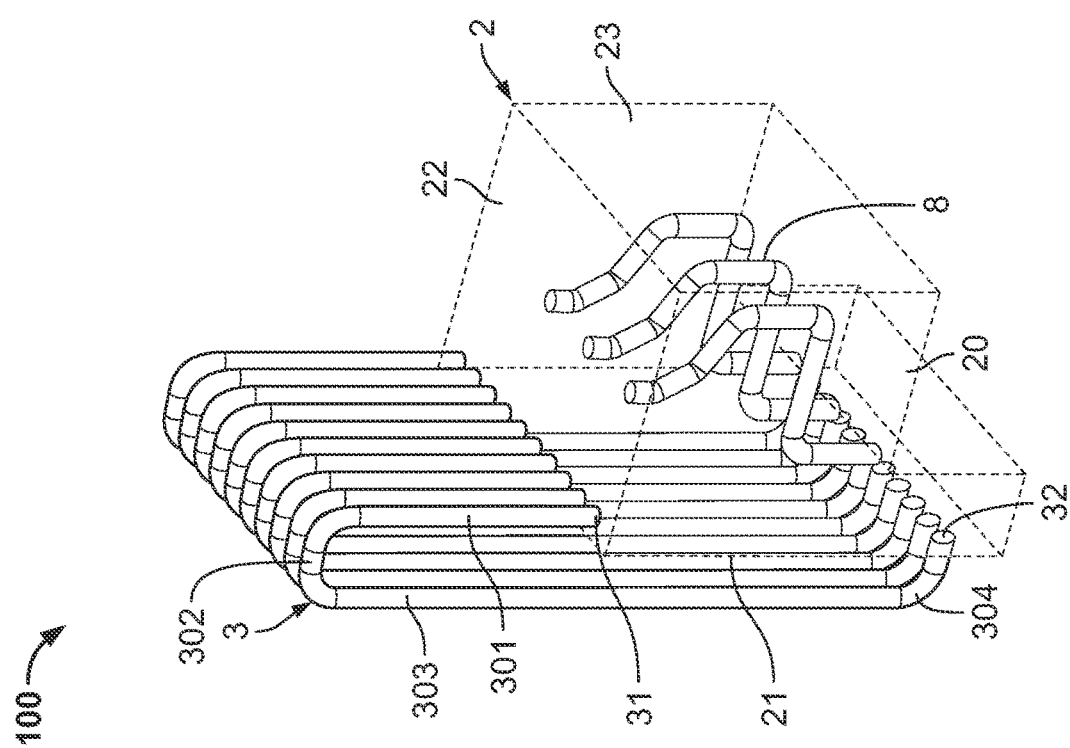
FIG. 3 is a perspective view of a switchgear assembly in accordance with an embodiment of the present disclosure.

FIG. 3 is a perspective view of a switchgear assembly in accordance with an embodiment of the present disclosure, and FIG. 4 is a side view of the switchgear assembly as shown in FIG. 3. As shown in FIGS. 3 and 4, the housing 2 includes a rear sidewall 21, a top wall 22, and a front sidewall 23 opposite to the rear sidewall 21. Various components 8, such as a main bus, copper bars, a three-position switch, and a circuit breaker, are arranged inside the housing 2. The circulating tubes 3 are arranged near to the rear sidewall 21 of the housing 2. The gas inlet 31 of each circulating tube 3 is coupled to the top wall 22 of the housing 2 and in fluid communication with the internal space 20. The gas outlet 32 of each circulating tube 3 is coupled to the rear sidewall 21 of the housing 2 and in fluid communication with the internal space 20.

In some embodiments, as shown in FIGS. 3 and 4, each of the circulating tubes 3 includes a first straight part 301, a first curved part 302, a second straight part 303, and a second curved part 304 connected in series between the gas inlet 31 and the gas outlet 32. The gas inlet 31 is positioned on the first straight part 301. The gas outlet 32 is positioned on the second curved part 304. The first straight part 301 extends upwards from the gas inlet 31 to the first curved part 302. The second straight part 303 extends downwards from the first curved part 302 to the second curved part 304. In other embodiments, each of the circulating tubes 3 may have other configurations. The scope of the present disclosure is not intended to be limited in this respect.

With the arrangement of the switchgear assembly 100 as shown in FIGS. 3 and 4, when the temperature of the components 8 rises, the insulating gas of high temperature in the internal space 20 would move upwards and flow into the circulating tubes 3 via the gas inlets 31. Since the first straight part 301 extends upwards from the gas inlet 31, the insulating gas is easy to flow into the first straight part 301 due to the chimney effect. Then, the insulating gas of high temperature may exchange heat with the external environment via the circulating tubes 3. The circulating tubes 3 may provide high heat dissipation efficiency due to the large contact area with the external environment. In addition, the insulating gas of high temperature may exchange heat with cold insulating gas inside the circulating tubes 3. Then, the insulating gas having been cooled may return into the internal space 20 of the housing 2 via the gas outlets 32 and thus cool the components 8 in the housing 2. In addition, the circulating tubes 3 are easy to be bent and mounted, reducing cost compared to the conventional fins for heat dissipation.

In some embodiments, as shown in FIGS. 3 and 4, the gas inlets 31 of the circulating tubes 3 are aligned with each other. In other embodiments, the gas inlets 31 of the circulating tubes 3 may be not aligned with each other. For example, the gas inlets 31 of the circulating tubes 3 may be arranged in various patterns. The scope of the present disclosure is not intended to be limited in this respect.

In some embodiments, as shown in FIGS. 3 and 4, the gas outlets 32 of the circulating tubes 3 are aligned with each other. In other embodiments, the gas outlets 32 of the plurality of circulating tubes 3 may be not aligned with each other. For example, the gas outlets 32 of the circulating tubes 3 may be arranged in various patterns. The scope of the present disclosure is not intended to be limited in this respect.

In some embodiments, as shown in FIGS. 3 and 4, the gas inlet 31 of each circulating tube 3 is directly soldered onto the top wall 22 of the housing 2, and the gas outlet 32 of each circulating tube 3 is directly soldered onto the rear sidewall 21 of the housing 2. In other embodiments, the gas inlets 31 and the gas outlets 32 of the circulating tubes 3 may be fixed onto the housing 2 in other manners. For example, the gas inlets 31 and the gas outlets 32 may be detachably mounted on the housing 2 through fasteners, such as screws. The scope of the present disclosure is not intended to be limited in this respect.

Figure 6:
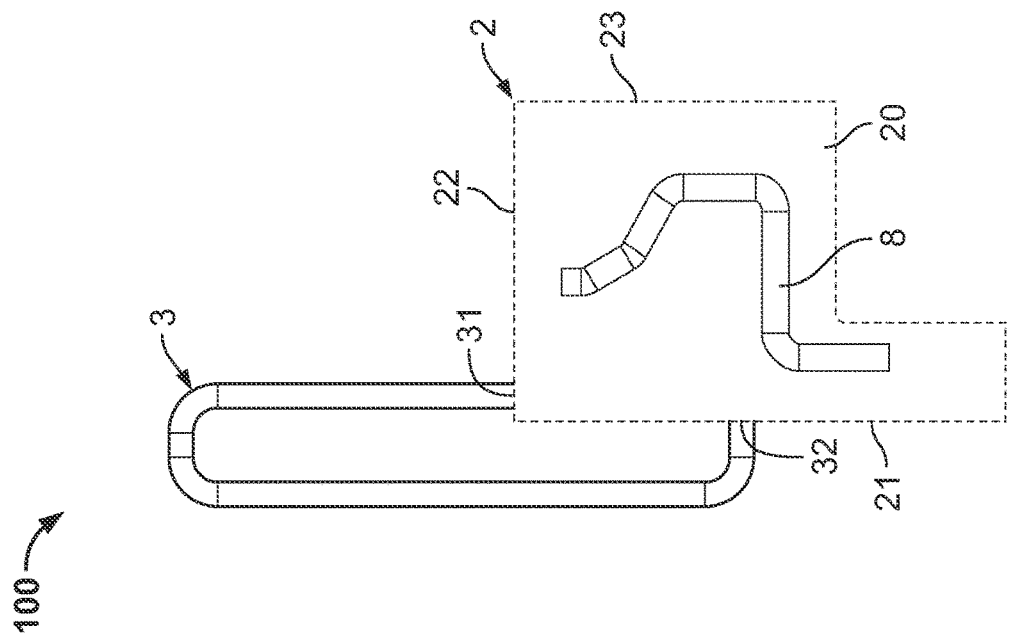
FIG. 6 is a side view of the switchgear assembly as shown in FIG. 5.
Figure 5:
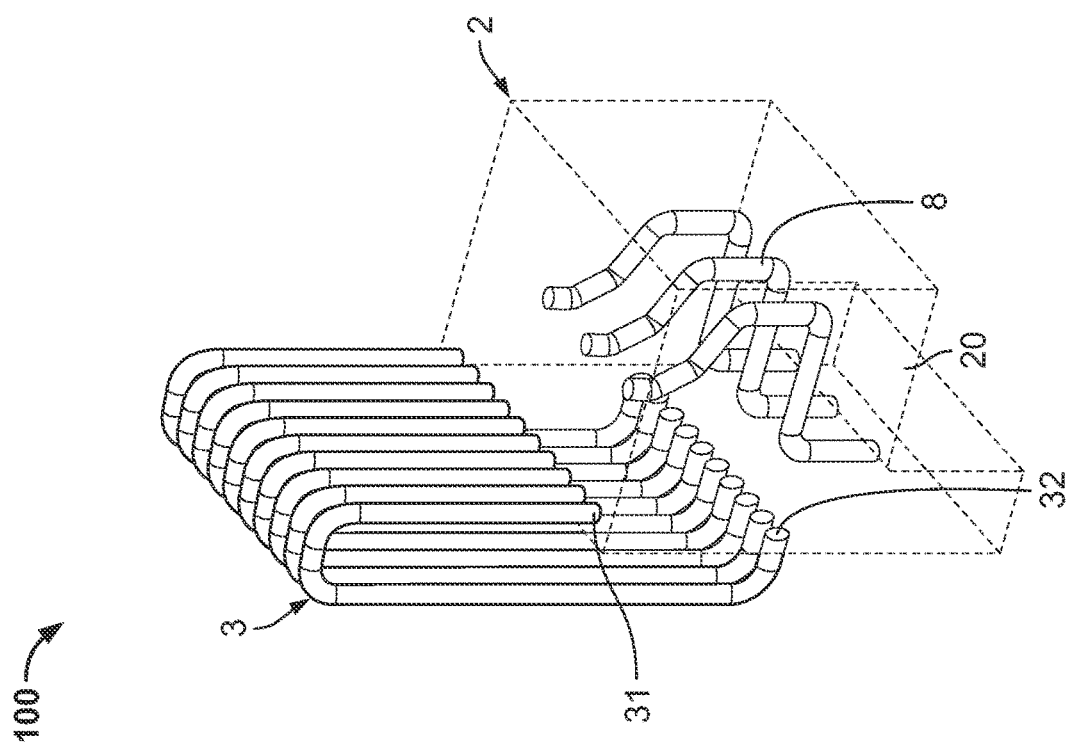
FIG. 5 is a perspective view of a switchgear assembly in accordance with another embodiment of the present disclosure.

FIG. 5 is a perspective view of a switchgear assembly in accordance with another embodiment of the present disclosure, and FIG. 6 is a side view of the switchgear assembly as shown in FIG. 5. The construction of the switchgear assembly 100 as shown in FIGS. 5 and 6 is similar to that of the switchgear assembly 100 as shown in FIGS. 3 and 4. The difference between them is in that the gas outlets 32 are arranged at different positions on the rear sidewall 21. Specifically, the gas outlets 32 of the switchgear assembly 100 as shown in FIGS. 5 and 6 are arranged at a higher position than the gas outlets 32 of the switchgear assembly 100 as shown in FIGS. 3 and 4. It is to be understood that, in embodiments of the present disclosure, the gas outlets 32 of the switchgear assembly 100 may be arranged at various positions on the rear sidewall 21, as long as each gas outlet 32 is arranged at a position lower than the respective gas inlet 31. In some embodiments, the position of the gas outlets 32 may be determined based on the position of critical components, such as the three-position switch and the circuit breaker. Through arranging the gas outlets 32 close to the critical components, the heat dissipation performance of the circulating tubes 3 may be further improved.

Figure 8:
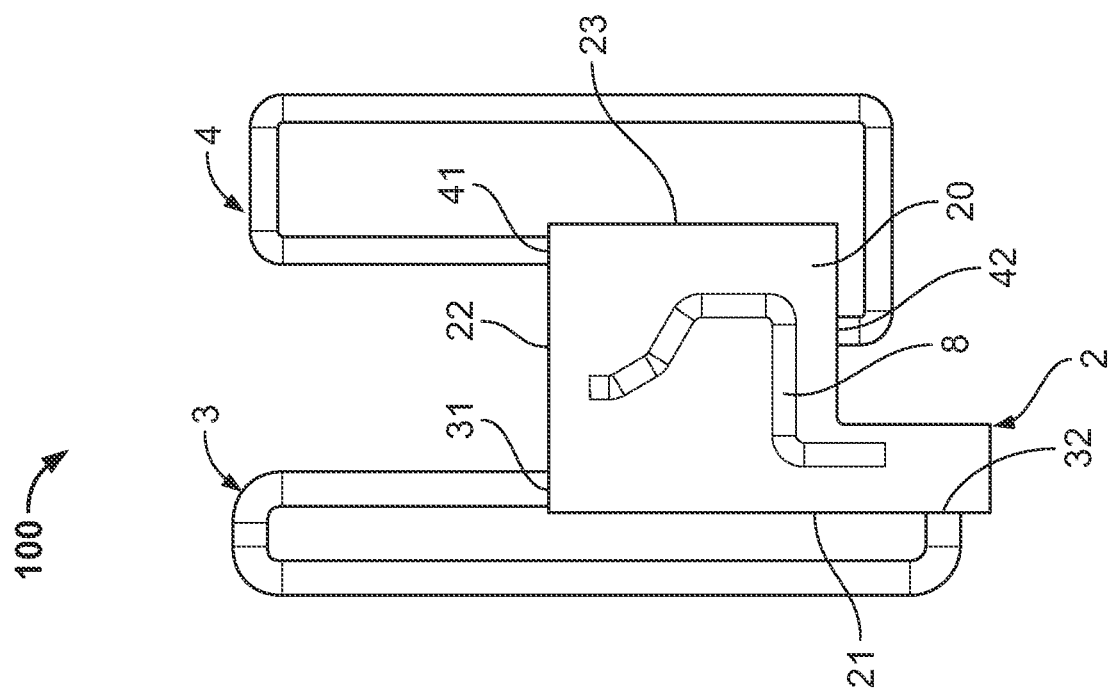
FIG. 8 is a side view of the switchgear assembly as shown in FIG. 7.
Figure 7:
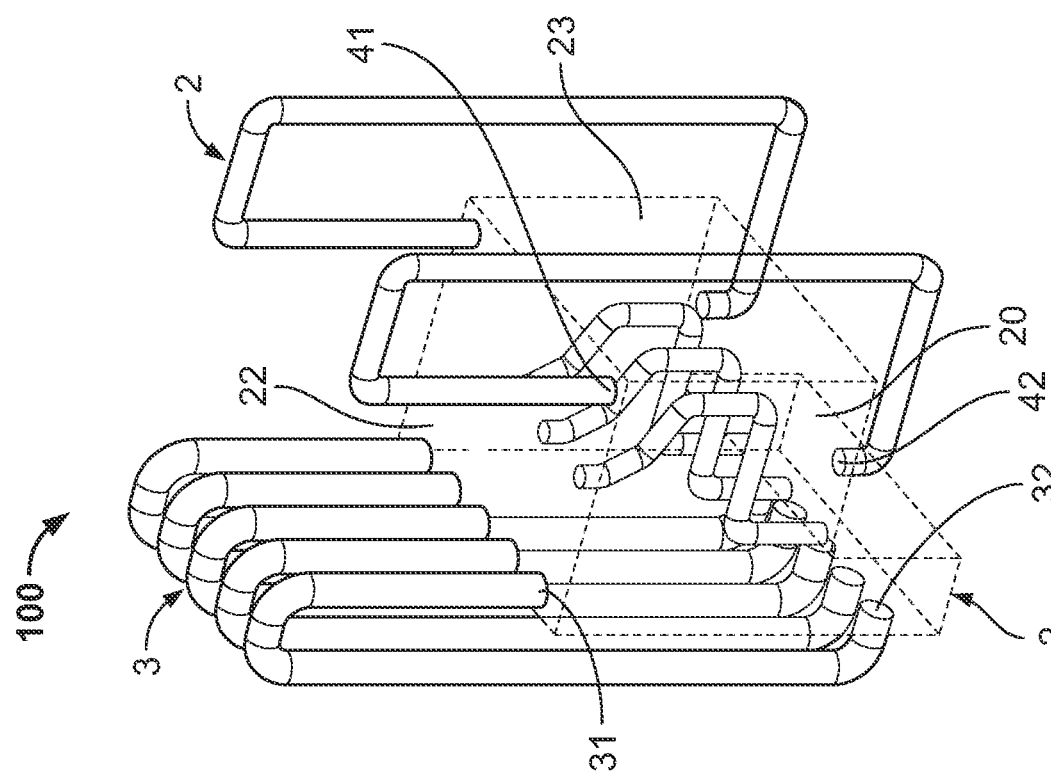
FIG. 7 is a perspective view of a switchgear assembly in accordance with another embodiment of the present disclosure.

FIG. 7 is a perspective view of a switchgear assembly in accordance with another embodiment of the present disclosure, and FIG. 8 is a side view of the switchgear assembly as shown in FIG. 7. The construction of the switchgear assembly 100 as shown in FIGS. 7 and 8 is similar to that of the switchgear assembly 100 as shown in FIGS. 3 and 4. The difference between them is in that the switchgear assembly 100 as shown in FIGS. 7 and 8 further includes a plurality of additional circulating tubes 4 arranged near to the front sidewall 23 of the housing 2 and in fluid communication with the internal space 20. Each of the additional circulating tubes 4 includes a second gas inlet 41 and a second gas outlet 42. The second gas inlet 41 is coupled to the top wall 22 of the housing 2 and the second gas outlet 42 is coupled to the bottom of the housing 2. With such an arrangement, the insulating gas may also be circulated between the housing 2 and the additional circulating tubes 4. In this way, the components 8 near to the front sidewall 23 of the housing 2 may be efficiently cooled. In some embodiments, the second gas inlets 41 and the second gas outlets 42 of the additional circulating tubes 4 may be arranged close to the critical components so as to further improve the cooling performance on the critical components.

Figure 10:
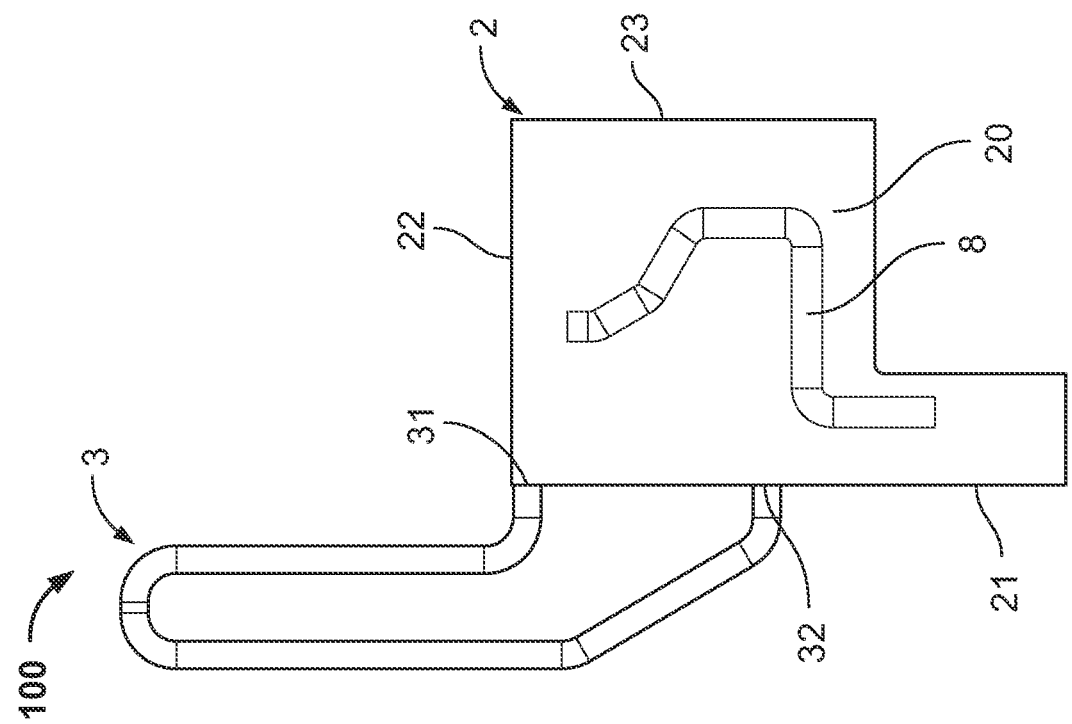
FIG. 10 is a side view of the switchgear assembly as shown in FIG. 9.
Figure 9:
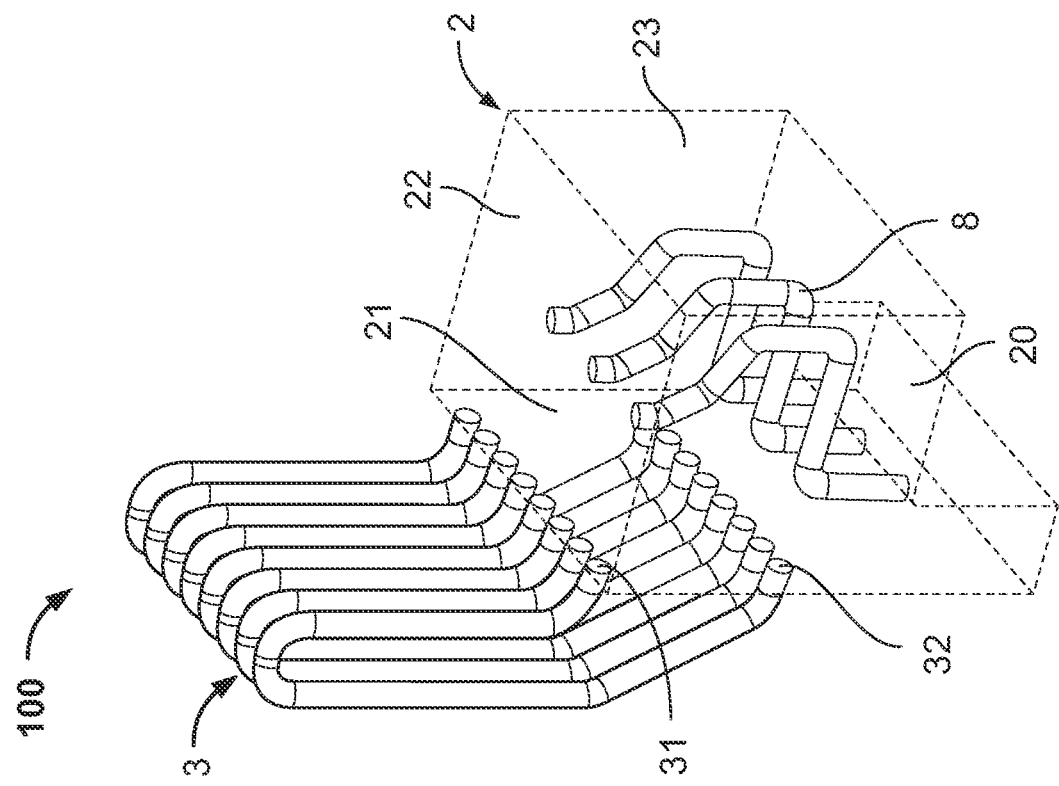
FIG. 9 is a perspective view of a switchgear assembly in accordance with another embodiment of the present disclosure.

FIG. 9 is a perspective view of a switchgear assembly in accordance with another embodiment of the present disclosure, and FIG. 10 is a side view of the switchgear assembly as shown in FIG. 9. The construction of the switchgear assembly 100 as shown in FIGS. 9 and 10 is similar to that of the switchgear assembly 100 as shown in FIGS. 3 and 4. The difference between them is in that both the gas inlet 31 and the gas outlet 32 of each circulating tube 3 as shown in FIGS. 9 and 10 are coupled to the rear sidewall 21 of the housing 2. Since both the gas inlet 31 and the gas outlet 32 of each circulating tube 3 are coupled to the same wall of the housing 2, it is easy to precisely position the circulating tubes 3 relative to the housing 2. In this way, it is more easier to assembly the circulating tubes 3 onto the housing 2.

In some embodiments, as shown in FIGS. 9 and 10, the gas inlet 31 and the gas outlet 32 of each circulating tube 3 are soldered to the rear sidewall 21 of the housing 2. In other embodiments, the gas inlet 31 and the gas outlet 32 of each circulating tube 3 may be coupled to the rear sidewall 21 of the housing 2 via fasteners, such as screws, which will be described in detail hereinafter with reference to FIGS. 11-17.

Figure 12:
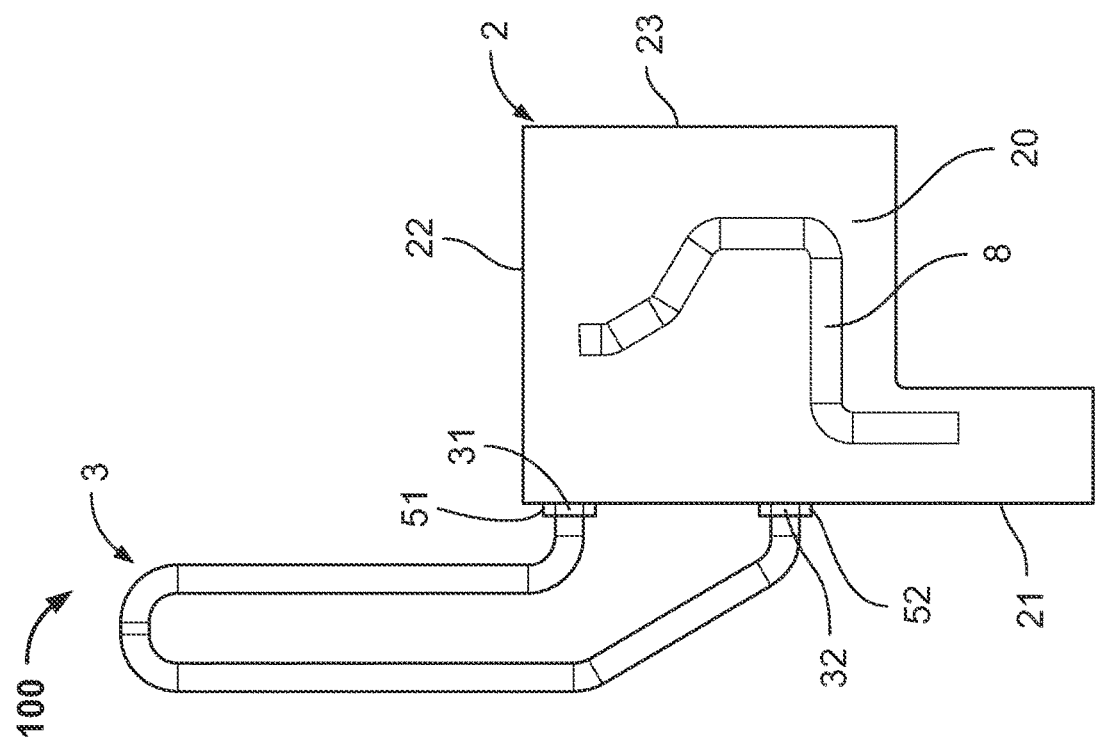
FIG. 12 is a side view of the switchgear assembly as shown in FIG. 11.
Figure 11:
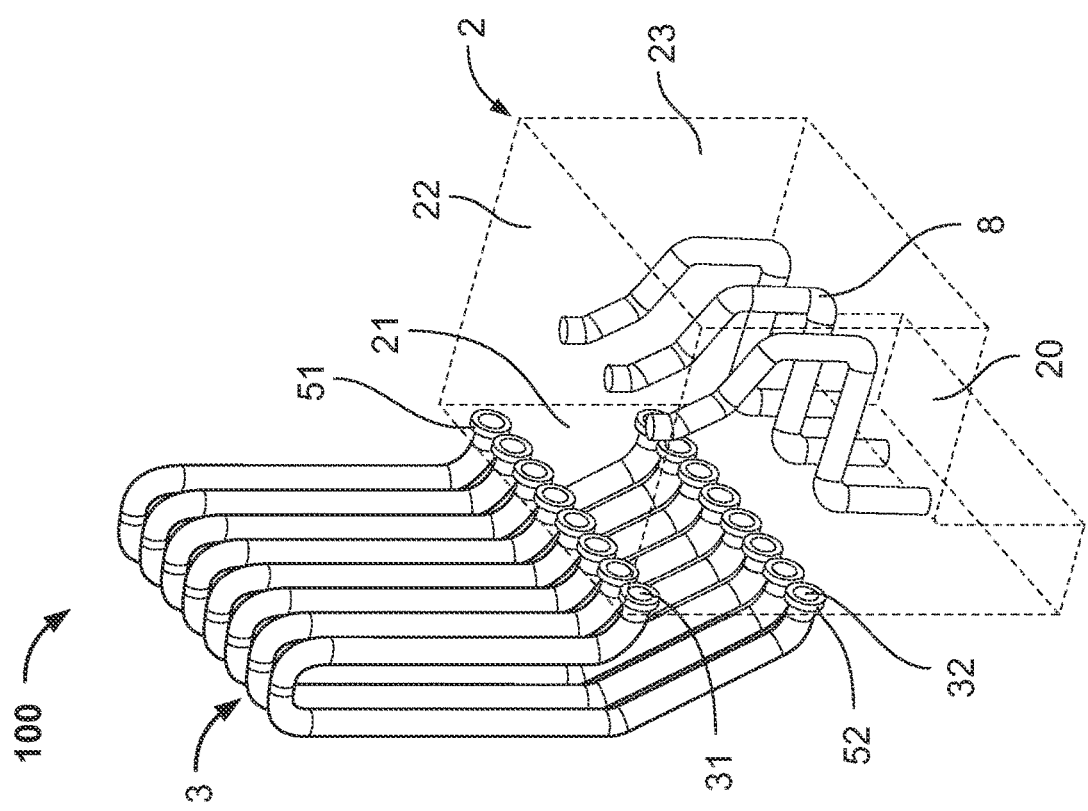
FIG. 11 is a perspective view of a switchgear assembly in accordance with another embodiment of the present disclosure.

FIG. 11 is a perspective view of a switchgear assembly in accordance with another embodiment of the present disclosure, and FIG. 12 is a side view of the switchgear assembly as shown in FIG. 11. As shown in FIGS. 11 and 12, the gas inlet 31 of each circulating tube 3 is provided with a first flange 51, and the gas outlet 32 of each circulating tube 3 is provided with a second flange 52. The first and second flanges 51, 52 are coupled to the rear sidewall 21 of the housing 2 via the fasteners (not shown). With such an arrangement, the circulating tubes 3 would be easy for maintenance.

FIG. 13 is a perspective view of a switchgear assembly in accordance with another embodiment of the present disclosure, and FIG. 14 is a side view of the switchgear assembly as shown in FIG. 13. The construction of the switchgear assembly 100 as shown in FIGS. 13 and 14 is similar to that of the switchgear assembly 100 as shown in FIGS. 11 and 12. The difference between them is in that the gas inlets 31 of two circulating tubes 3 are coupled to a first connecting part 53 and the gas outlets 32 of the two circulating tubes 3 are coupled to a second connecting part 54. The first and second connecting parts 53, 54 are coupled to the rear sidewall 21 of the housing 2 via the fasteners. In other embodiments, the gas inlets 31 and the gas outlets 32 of more than two circulating tubes 3 may be coupled to the first connecting part 53 and the second connecting part 54 respectively. The scope of the present disclosure is not intended to be limited in this respect.

Figure 15:
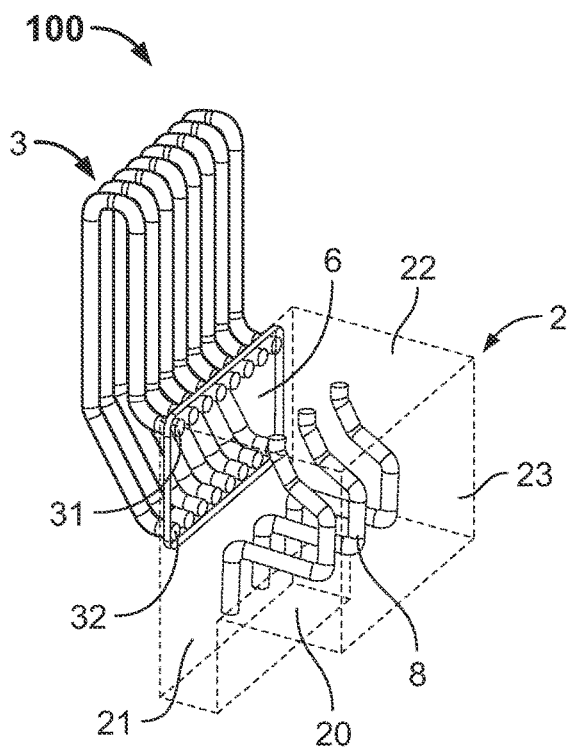
FIG. 15 is a perspective view of a switchgear assembly in accordance with another embodiment of the present disclosure.
Figure 16:
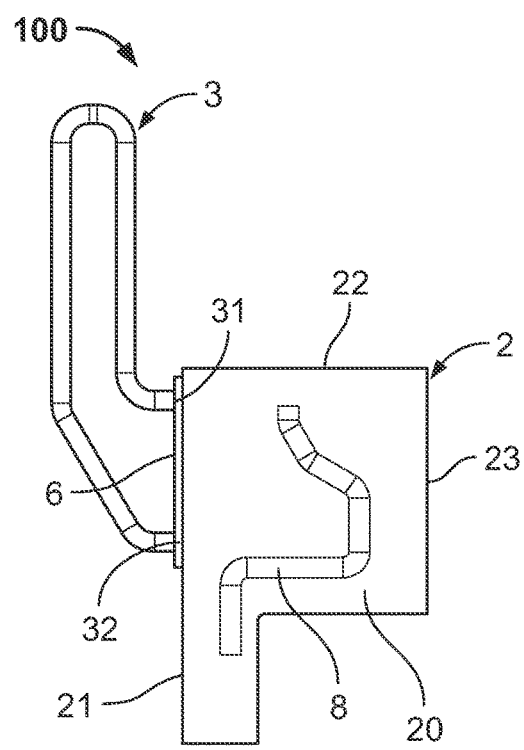
FIG. 16 is a side view of the switchgear assembly as shown in FIG. 15.
Figure 17:
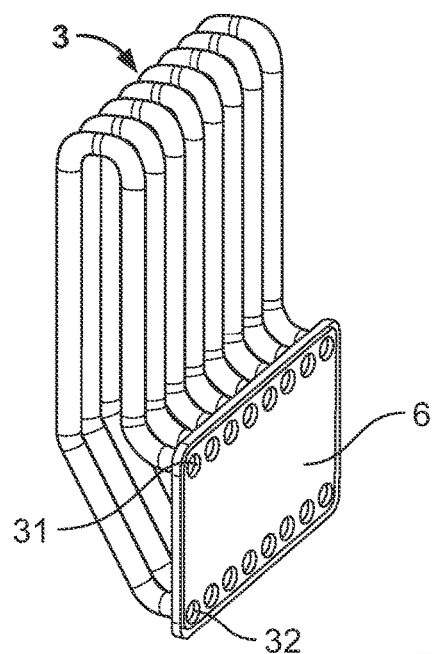
FIG. 17 is a perspective view of circulating tubes in the switchgear assembly as shown in FIG. 15.

FIG. 15 is a perspective view of a switchgear assembly in accordance with another embodiment of the present disclosure, FIG. 16 is a side view of the switchgear assembly as shown in FIG. 15, and FIG. 17 is a perspective view of circulating tubes in the switchgear assembly as shown in FIG. 15. The construction of the switchgear assembly 100 as shown in FIGS. 15-17 is similar to that of the switchgear assembly 100 as shown in FIGS. 11 and 12. The difference between them is in that the gas inlets 31 and the gas outlets 32 of the circulating tubes 3 as shown in FIGS. 15-17 are coupled to a mounting plate 6. The mounting plate 6 is coupled to the rear sidewall 21 of the housing 2 via the fasteners.

Figure 18:
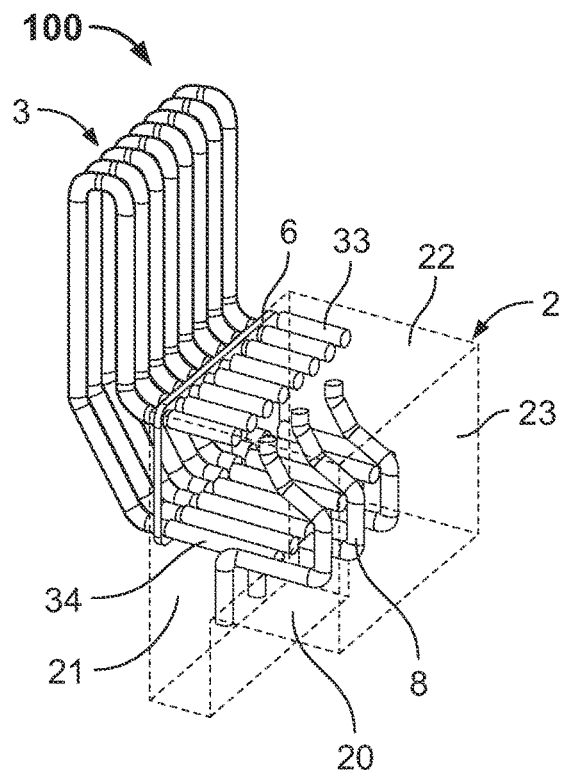
FIG. 18 is a perspective view of a switchgear assembly in accordance with another embodiment of the present disclosure.
Figure 19:
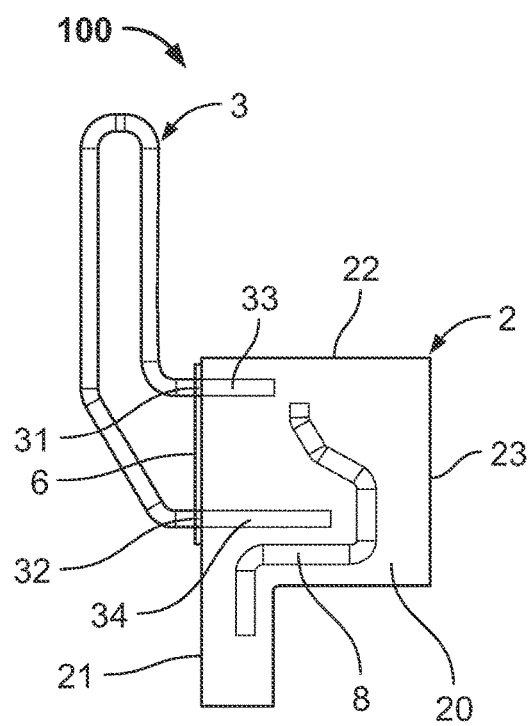
FIG. 19 is a side view of the switchgear assembly as shown in FIG. 18.
Figure 20:
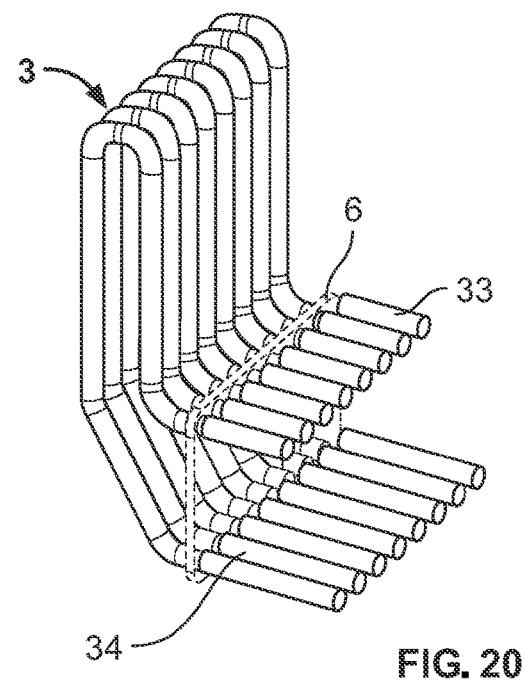
FIG. 20 is a perspective view of circulating tubes in the switchgear assembly as shown in FIG. 18.

FIG. 18 is a perspective view of a switchgear assembly in accordance with another embodiment of the present disclosure, FIG. 19 is a side view of the switchgear assembly as shown in FIG. 18, and FIG. 20 is a perspective view of circulating tubes in the switchgear assembly as shown in FIG. 18. The construction of the switchgear assembly 100 as shown in FIGS. 18-20 is similar to that of the switchgear assembly 100 as shown in FIGS. 15-17. The difference between them is in that each of the circulating tubes 3 as shown in FIGS. 18-20 further includes a first tubular extension part 33 and a second tubular extension part 34. The first tubular extension part 33 extends from the mounting plate 6 into the internal space 20 and is in fluid communication with the respective gas inlet 31. The second tubular extension part 34 extends from the mounting plate 6 into the internal space 20 and is in fluid communication with the respective gas outlet 32. With such an arrangement, the insulating gas closer to the components 8 may be directed into the circulating tubes 3 via the first tubular extension part 33, and the insulating gas of low temperature may be directed onto a position closer to the components 8 via the second tubular extension part 34. Thus, the cooling effect on the components 8 would be further improved.

Figure 21:
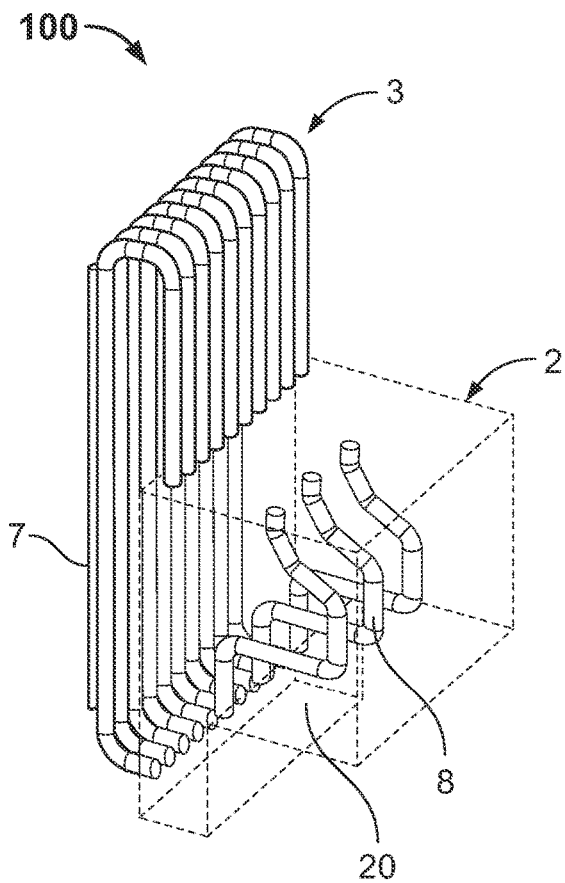
FIG. 21 is a perspective view of a switchgear assembly in accordance with another embodiment of the present disclosure.
Figure 22:
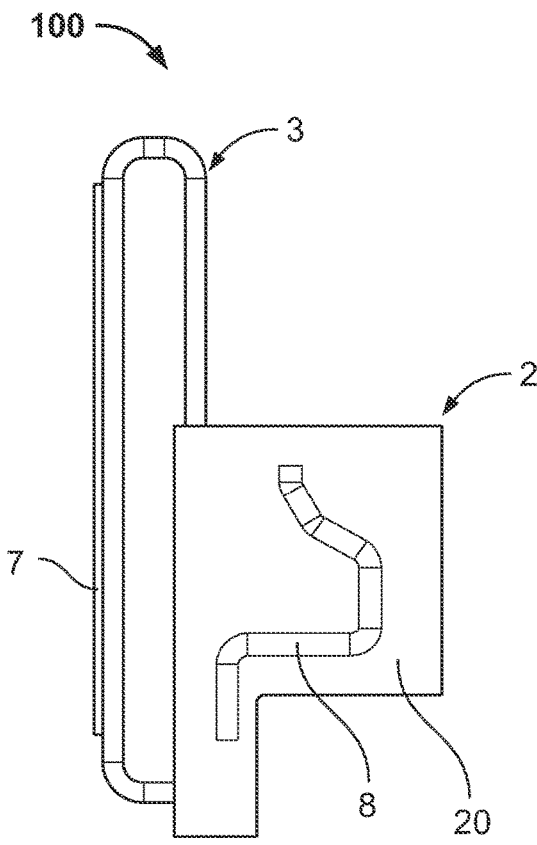
FIG. 22 is a side view of the switchgear assembly as shown in FIG. 21.
Figure 23:
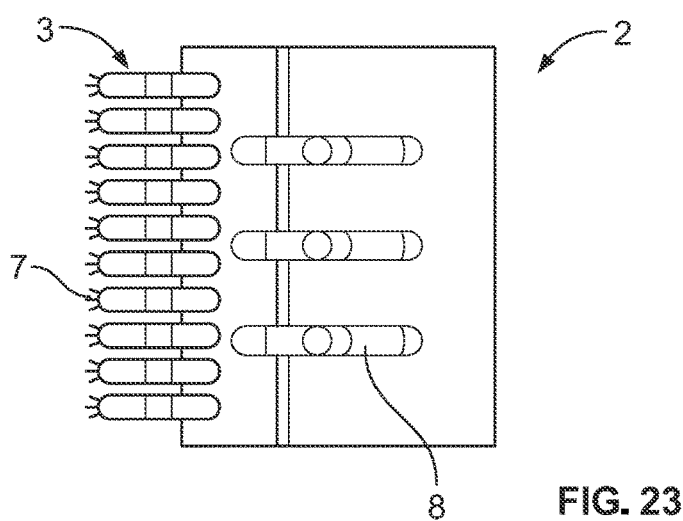
FIG. 23 is a top view of the switchgear assembly as shown in FIG. 21.
Figure 24:
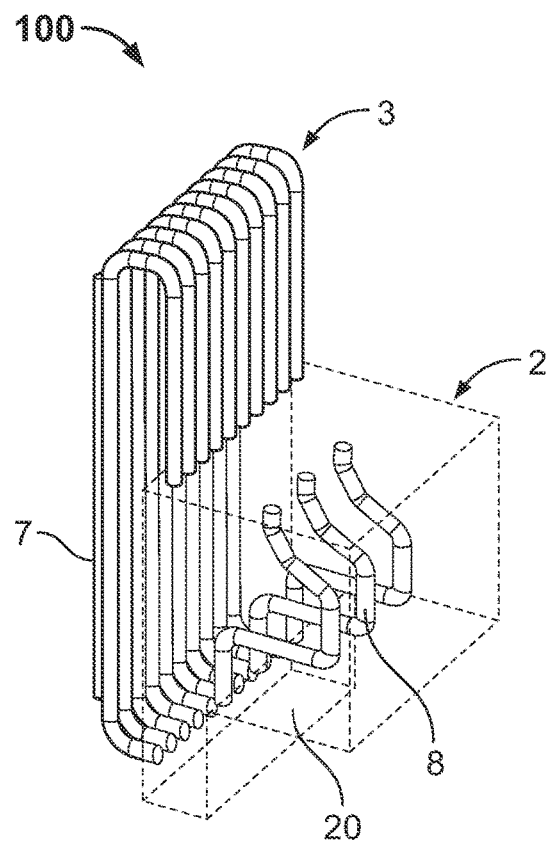
FIG. 24 is a perspective view of a switchgear assembly in accordance with another embodiment of the present disclosure.
Figure 25:
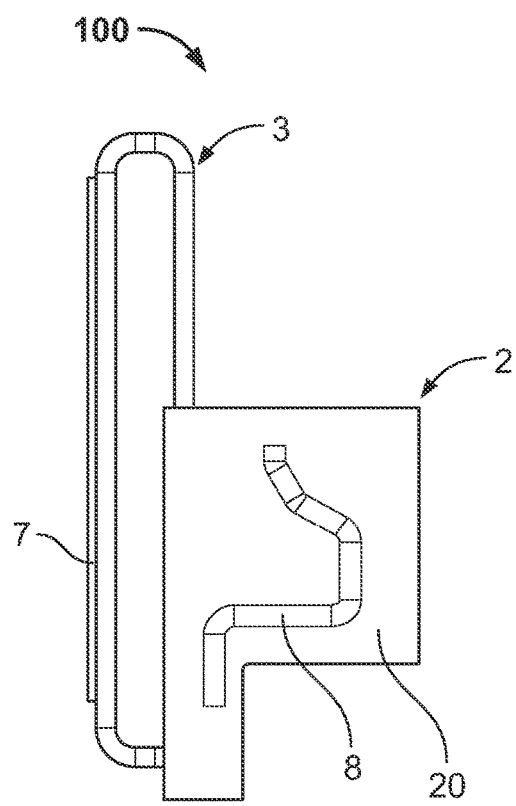
FIG. 25 is a side view of the switchgear assembly as shown in FIG. 24.
Figure 26:
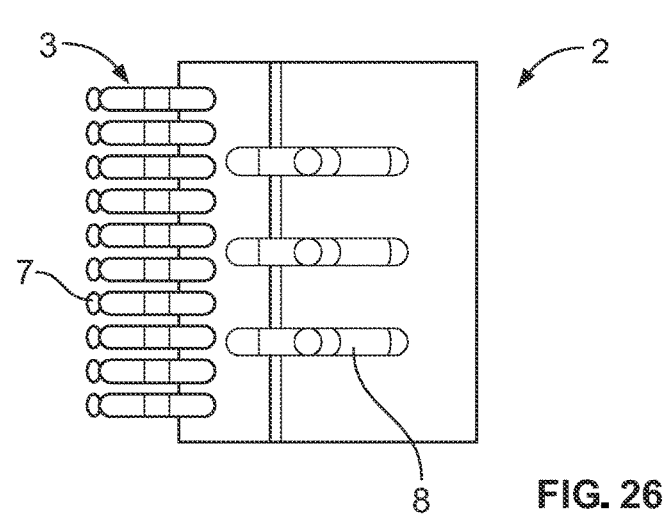
FIG. 26 is a top view of the switchgear assembly as shown in FIG. 24.

In some embodiments, as shown in FIGS. 21-26, outer surfaces of the circulating tubes 3 may be provided with heat sinks 7. It is to be understood that, in other embodiments, the heat sinks 7 may be only provided on a part of the outer surfaces of the circulating tubes 3. In addition, the heat sinks 7 may be of various forms. For example, as shown in FIGS. 21-23, the heat sinks 7 may be fins. As shown in FIGS. 24-26, the heat sinks 7 may be of other shapes, such as fan-shaped. Through the heat sinks 7, the cooling effect on the components 8 may be further improved.

It is to be understood that the housing 2 of the switchgear assembly 100 is not limited to the configuration as described above, but may be of any other configuration. The scope of the present disclosure is not intended to be limited in this respect.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A switchgear assembly comprising:
    a housing comprising a rear sidewall and a top wall defining an internal space filled with an insulating gas;
    a plurality of circulating tubes arranged on the housing, each of the plurality of circulating tubes comprising:
        a gas inlet connected to a respective opening arranged in the top wall,
        a gas outlet connected to a respective opening arranged in the rear sidewall, and
        a straight part located in between the gas inlet and the gas outlet,
            wherein a cross section of the straight part comprises a circular shape, and
            wherein the gas inlet and the gas outlet are in fluid communication with the internal space, wherein the gas inlet of each of the plurality of circulating tubes is arranged at a position higher than the respective gas outlet such that the insulating gas is circulated between the housing and the plurality of circulating tubes;
    wherein the plurality of circulating tubes are arranged near to the rear sidewall of the housing; and
    wherein an opening size of the gas inlet of each of the plurality of circulating tubes is larger than that of an opening size of the respective gas outlet to provide improved heat dissipation performance of each of the plurality of circulating tubes.

2. The switchgear assembly according to claim 1, wherein the gas inlets of the plurality of circulating tubes are aligned with each other, and the gas outlets of the plurality of circulating tubes are aligned with each other.

3. The switchgear assembly according to claim 1, wherein the plurality of circulating tubes are soldered on the housing.

4. The switchgear assembly according to claim 1, wherein the plurality of circulating tubes are detachably mounted on the housing via fasteners.

5. The switchgear assembly according to claim 1, further comprising a fan configured to blow air towards the plurality of circulating tubes.

6. The switchgear assembly according to claim 1, wherein the housing further comprises a front sidewall opposite to the rear sidewall, and
the switchgear assembly further comprises a plurality of additional circulating tubes arranged near to the front sidewall of the housing and in fluid communication with the internal space.

7. The switchgear assembly according to claim 1, wherein the gas inlet and the gas outlet of each of the plurality of circulating tubes are coupled to the rear sidewall of the housing.

8. The switchgear assembly according to claim 7, wherein the gas inlet of each of the plurality of circulating tubes is provided with a first flange,
the gas outlet of each of the plurality of circulating tubes is provided with a second flange, and
the first and second flanges are coupled to the rear sidewall of the housing via fasteners.

9. The switchgear assembly according to claim 7, wherein the gas inlets of two or more of the plurality of circulating tubes are coupled to a first connecting part,
the gas outlets of the two or more of the plurality of circulating tubes are coupled to a second connecting part, and
the first and second connecting parts are coupled to the rear sidewall of the housing via fasteners.

10. The switchgear assembly according to claim 7, wherein the gas inlets and the gas outlets of the plurality of circulating tubes are coupled to a mounting plate, and
the mounting plate is coupled to the rear sidewall of the housing via fasteners.

11. The switchgear assembly according to claim 10, wherein each of the plurality of circulating tubes further comprises:
a first tubular extension part extending from the mounting plate into the internal space and being in fluid communication with the respective gas inlet; and
a second tubular extension part extending from the mounting plate into the internal space and being in fluid communication with the respective gas outlet.

12. The switchgear assembly according to claim 1, wherein an outer surface of at least one of the plurality of circulating tubes is provided with a heat sink.

13. A switchgear comprising the switchgear assembly according to claim 1.

14. A switchgear assembly comprising:
a housing,
wherein the housing includes a rear sidewall, a top wall, and an internal space,
wherein the internal space of the housing is filled with an insulating gas; and
a plurality of circulating tubes,
wherein the plurality of circulating tubes are arranged near to the rear sidewall on the housing, each of the plurality of circulating tubes comprising:
a gas inlet connected to a respective opening arranged in the top wall,
a gas outlet connected to a respective opening arranged in the rear wall,
a first curved part,
a straight part, and
a second curved part,
wherein the first curved part, the straight part, and the second curved part are connected in series between the gas inlet and the gas outlet,
wherein the gas inlet and the gas outlet are both in fluid communication with the internal space,
wherein the gas inlet of each of the plurality of circulating tubes is arranged at a position higher than the respective gas outlet such that the insulating gas is circulated between the housing and the plurality of circulating tubes, and
wherein a cross section of the second straight part extending between the first curved part and the second curved part comprises a circular shape.

15. A switchgear comprising the switchgear assembly according to claim 14.

16. A switchgear assembly comprising:
a housing,
wherein the housing includes a rear sidewall, a top wall, and an internal space,
wherein the internal space is fillable with an insulating gas; and a circulating tube,
wherein the circulating tube is arranged near to the rear sidewall on the housing, the circulating tube comprising:
a gas inlet connected to a respective opening arranged in the top wall,
a gas outlet connected to a respective opening arranged in the rear sidewall, and
a straight part,
wherein the gas inlet and the gas outlet are both in fluid communication with the internal space,
wherein the gas inlet is arranged at a position higher than the gas outlet such that the insulating gas can be circulated between the housing and the circulating tube,
wherein an opening size of the gas inlet is larger than that of an opening size of the respective gas outlet, and
wherein a cross section of the straight part comprises a circular shape.

17. A switchgear comprising the switchgear assembly according to claim 16.

* * * * *